Jan. 8, 1957 J. S. MICHIE 2,776,575
V-BELT PULLEY DRIVE
Filed June 25, 1954 4 Sheets-Sheet 1

INVENTOR.
JOHN S. MICHIE,
BY:
Harold B. Hood
ATTORNEY.

Jan. 8, 1957     J. S. MICHIE     2,776,575
V-BELT PULLEY DRIVE
Filed June 25, 1954     4 Sheets-Sheet 2

INVENTOR.
JOHN S. MICHIE,
BY: Harold B. Hood
ATTORNEY.

Jan. 8, 1957  J. S. MICHIE  2,776,575
V-BELT PULLEY DRIVE
Filed June 25, 1954  4 Sheets-Sheet 3

INVENTOR.
JOHN S. MICHIE,
BY:
Harold B. Hood
ATTORNEY.

Jan. 8, 1957    J. S. MICHIE    2,776,575
V-BELT PULLEY DRIVE

Filed June 25, 1954    4 Sheets-Sheet 4

INVENTOR.
JOHN S. MICHIE,
BY:
Harold B. Hood
ATTORNEY.

United States Patent Office 2,776,575
Patented Jan. 8, 1957

2,776,575

V-BELT PULLEY DRIVE

John S. Michie, Columbus, Ind., assignor to Reeves Pulley Company, Columbus, Ind., a corporation of Indiana Application June 25, 1954, Serial No. 439,325

1 Claim. (Cl. 74—230.17)

The present invention relates to a V-belt pulley drive, and is particularly concerned with improvement of the power-transmitting capacity of such a drive.

In my copending application Serial No. 378,553, filed September 4, 1953, for Keyless Resiliently-Expansible V-Pulley, I have pointed out the fact that certain power losses which arise in V-belt drives, and particularly in expansible V-pulley type drives, can be overcome by departing from conventional structure to the extent of mounting one disc of an expansible V-pulley for free rotation relative to the shaft upon which the pulley is supported. Such an arrangement, however, of course deprives the freely-mounted disc of any capacity for transmitting power between the shaft upon which it is supported and the belt with which it is associated, so that all transmission of power must be through the single region of contact between the belt and the companion disc of the pulley, which is fixed for rotation with the shaft.

In my copending application Serial No. 405,954, filed January 25, 1954, for Expansible V-Pulley with Variably Driven Elements and Speed Varying Drive, and in my copending application Serial No. 432,073, filed May 25, 1954, for Multiple-Belt, Variable-Speed Transmission with Differentially Associated Pulleys, I have disclosed means whereby the loss of power-transmission capacity which arises in an organization in which one disc is freely rotatable with respect to its supporting shaft, can be completely and fully overcome.

From the above disclosures, it is clear that a so-called keyless motor pulley will transmit more power than a conventional keyed motor pulley; and that, when the discs of such a pulley are differentially connected, the power transmission capacity is still further increased, because both discs thereupon carry their respective shares of the load. The primary object of the present invention is to produce an organization which may be referred to as a compromise between the keyless pulley of my above-identified application Serial No. 378,533, and the much more complicated, but very efficient structure of my above-identified application Serial No. 405,954. In the structure of the present disclosure, a substantial proportion of the power transmission will flow through a disc which is mounted for controlled rotational movement relative to its fellow and to the shaft from which it is supported; while the gain which is attained through the use of a so-called keyless pulley by elimination of the "fighting" or "bucking" which takes place between the belt edges in a conventional pulley, is obtained to a very substantial degree, whereby it is possible to operate such a drive with increased pressure exerted by the discs upon the belt edges.

It has long been known that, while an empirical formula has been evolved to express the power-transmitting capacity of a V-belt of known physical characteristics, in which the variable factors are cross-sectional area of the belt, pitch diameter and angle of inclination of the sides of the belt, area of contact, and spring pressure, and while this formula applies with considerable accuracy to V-belt drives between V-pulleys of fixed effective diameters, the actual power transmitting capacity of a transmission including expansible V-pulleys, and in which it is necessary to use a relatively wide V-belt, is only approximately 50% of the capacity indicated by the said formula. As is pointed out in my copending application Serial No. 405,954, I believe the deficiency of capacity of such transmissions is due primarily to what is called "bucking" within the body of the belt, arising when one side of the belt tends to run substantially ahead of the other side of the belt, both sides of the belt being engaged with discs which are relatively rotationally fixed. This difficulty is susbtantially overcome by the structure of the present disclosure, in which the tractive connection between one side of the belt and the shaft with which it is associated is less effective, to a controlled degree, than the tractive connection between the other side of the belt and said shaft.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claim is not violated.

Figure 1:
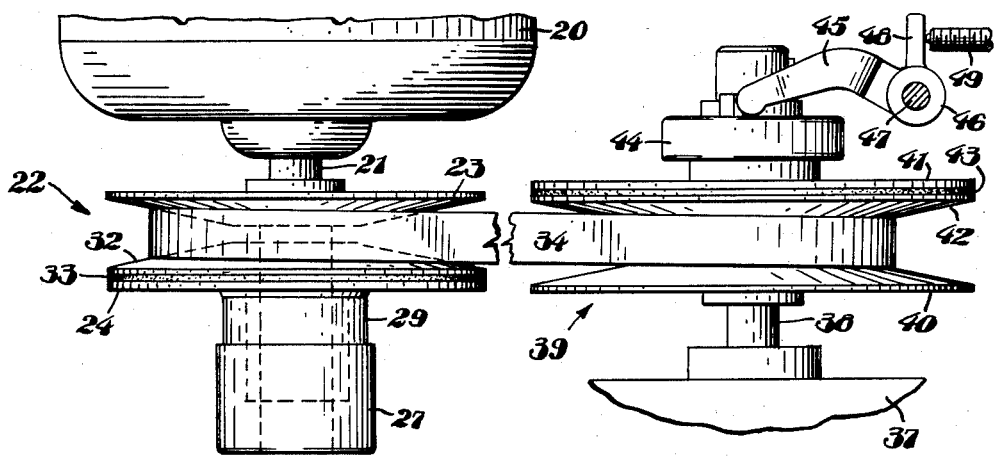
Fig. 1 is a fragmentary plan view of an expansible pulley, V-belt drive embodying one form of my invention.
Figure 2:
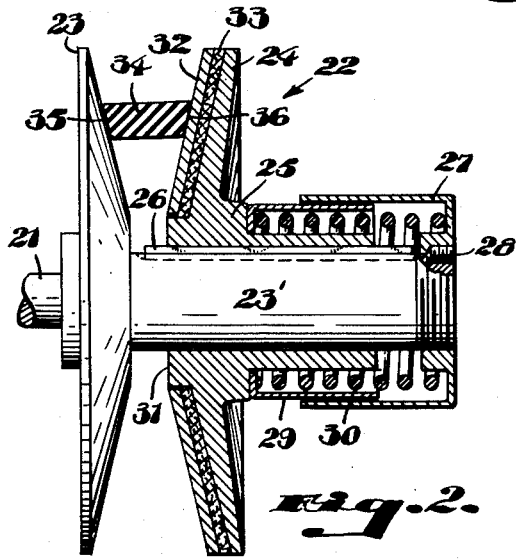
Fig. 2 is an elevational view, partly in section, of one of the pulleys illustrated in Fig. 1.

Referring more particularly to Figs. 1 and 2, it will be seen that I have indicated at 20 a conventional electric motor having a spindle 21 from which is supported an expansible V-pulley, indicated generally by the reference numeral 22. Said pulley comprises a coned disc 23 which, in the illustrated embodiment of the invention, is formed to provide an elongated hub 23' projecting axially from its coned face and sleeved on the spindle 21, to which it may be fixedly secured in any desired manner. A second disc 24, having a rearwardly projecting hub 25 is sleeved on the hub 23' and is secured against rotation relative thereto through the medium of a key 26, said disc 24 being axially movable relative to the shaft 21 and hub 23', toward and away from the disc 23.

A cylindrical shell 27 is fixed to the hub 23', as by means of the screw 28, and is telescopically associated with a companion shell 29, with which it cooperates to define a housing for a coiled spring 30 which is confined between the bases of the shells 27 and 29 to urge the disc 24 resiliently toward the disc 23.

The disc 24 is formed with a forwardly projecting hub 31 upon which is centered a coned element 32; and a clutch ring 33, formed of suitable friction material, such as cork, synthetic fiber, rubberoid material, or the like, is likewise centered on the projection 31 and is interposed between the annular flange of the disc 24 and the coned element 32. A V-belt 34 is adapted to be trained about the pulley 22, said belt being formed to provide opposite, lateral, flaring surfaces 35 and 36 which respectively engage the disc 23 and the coned element 32. In the form of invention here under discussion, the opposite lateral surfaces 35 and 36 of the belt 34 are of corresponding characteristics; and the ring 32 has frictional characteristics corresponding to the face of the disc 23. The material of the clutch ring 33 is so selected that, under conditions of pressure such as will be produced by the action of the spring 30, the frictional drag between the disc 24 and the coned element 32 will be less, to a predetermined degree, than the frictional drag between the surface 35 of the belt and the disc 23, and consequently less than the frictional drag between the surface 36 of the belt and the coned element 32. Thus, as the discs 23 and 24 rotate with the shaft 21, the tractive connection between the shaft and the surface 36 of the belt 334 will be less effective to a controlled degree than the tractive connection between the shaft and the surface 35 of said belt.

Now, it will be apparent from the above description of structure that, whereas the disc 24, acting through the clutch ring 33 and the coned element 32, will not contribute to the driving effect on the belt 34 so effectively as will the shiftable disc disclosed in my copending application Serial No. 405,954, it will nevertheless contribute to an extent measured by the controlled frictional drag resulting from the presence of the clutch ring 33 between the disc 24 and the coned element 32, whereby the driving capacity of the train connecting the shaft 21 with the belt 34 will be improved as compared with the keyless pulley structure of my copending application Serial No. 378,553. The structure described above obviates the defects of a conventional expansible V-pulley drive which are overcome by the keyless pulley, without concurrently losing the entire driving effect of the shiftable disc, and attains, to a substantial degree, the functional advantages of the pulley with differentially connected discs, without resorting to the relatively complicated, expensive and weight-increasing expedient of the differential connection.

In order to attain the advantages of the above described structure to a maximum degree, that lateral surface of the belt which engages the coned element 32 should ride that element at a pitch diameter slightly greater than the pitch diameter at which the opposite lateral surface rides the disc 23; and, in the organization disclosed in Fig. 1, this result is attained by setting the pulley 22 slightly out of true alignment with the pulley 39 mounted on the shaft 38 of the driven machine suggested at 37. The pulley 39 comprises a disc 40 like the disc 23 and a disc 41 like the disc 24 and having associated therewith a coned element 42 like the coned element 32 with a clutch ring 43 like the clutch ring 33 sandwiched between the disc 41 and the coned element 42. It will be perceived that, as a result of the misalignment above mentioned, the surface 35 of the belt 34 which engages the coned element 42 will ride a pitch diameter of that element slightly smaller than the pitch diameter upon which the surface 36 of the belt engages the disc 40; and this condition is essential to optimum performance of the assembly.

In the illustrated transmission, a thrust bearing is operatively associated with the disc 41, and the housing 44 thereof is engaged by a yoke 45 forming a part of a bell crank lever 46 journalled on a fixed pivot 47 and having a finger 48 engaged by a screw shaft 49, whereby the position of the disc 41, relative to the disc 40, may be controlled.

Figure 3:
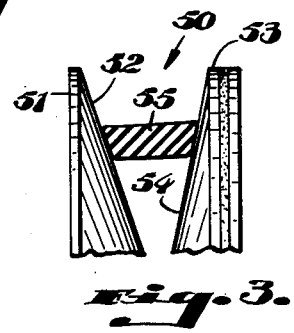
Fig. 3 is a fragmentary elevational view of a modified form of pulley.

The above described condition, under which that surface of the belt which engages the controlled-slipping coned element rides a pitch diameter different from that upon which the opposite surface of the belt rides the fixed coned disc, can be attained in other ways. For instance, in Fig. 3, I have indicated a pulley 50 similar to the pulley 22, but comprising a fixed disc 51 whose coned face 52 is contoured upon an angle different from the angle upon which the coned face 54 of the element 53 is contoured. Specifically, the angle included between the coned face 54 of the element 53 and a median plane perpendicular to the axis of the pulley, is less than the angle included between that plane and the coned face 52 of the disc 51, whereby the belt 55, whose opposite lateral surfaces are equally flared with respect to said plane, will ride in the cocked position illustrated in Fig. 3.

Figure 4:
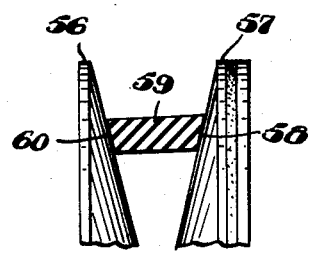
Fig. 4 is a fragmentary elevational view of a pulley similar to that shown in Fig. 2, illustrating a modified form of belt in association therewith.

Alternatively, and as suggested in Fig. 4, the disc 56 and the coned element 57 may be correspondingly contoured, while the opposite lateral faces 58 and 60 of the belt 59 are differently contoured, so that the angle included between the face 58 of the belt and the median plane of the belt is greater than the angle included between said plane and the surface 60 of the belt.

Figure 5:
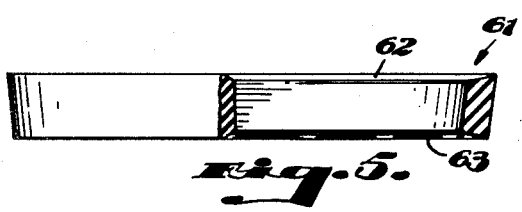
Fig. 5 is an elevational view, partly in section, of a novel form of belt.

As a still further possibility, I may use, with the pulley forms illustrated in Fig. 1, a belt 1, as illustrated in Fig. 5, so constructed that the pitch length of its surface 62, which will engage the coned element 32 and the disc 40, is longer than the pitch diameter of its surface 63 which will engage the disc 23 and the coned element 42.

Figure 6:
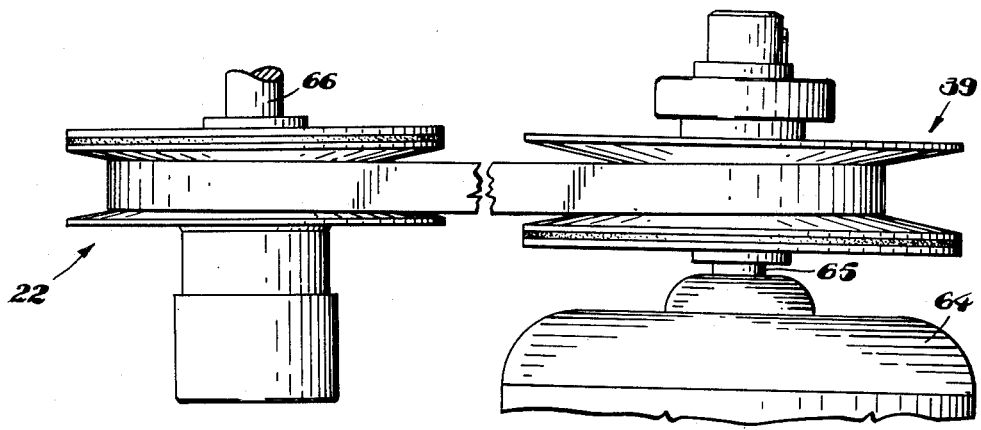
Fig. 6 is a view similar to Fig. 1 but showing a modified assembly.

Still a further arrangement is illustrated in Fig. 6, in which the pulley 39 of Fig. 1 is mounted on the spindle 65 of a motor 64, while the pulley 22 of Fig. 1 is mounted on a driven shaft 66. It will be noted that, in this arrangement, the shafts 65 and 66 are arranged in non-parallel relation to attain the above described condition in which that surface of the belt which engages the coned element of the pulley on the driving shaft rides a slightly larger pitch diameter than the opposite surface of the belt rides on the fixed disc of the driving pulley, while the latter surface rides a slightly smaller pitch diameter on the coned element of the driven pulley than does the first mentioned belt surface on the fixed disc of the driven pulley.

Figures 7, 8, 9, 10, 11:
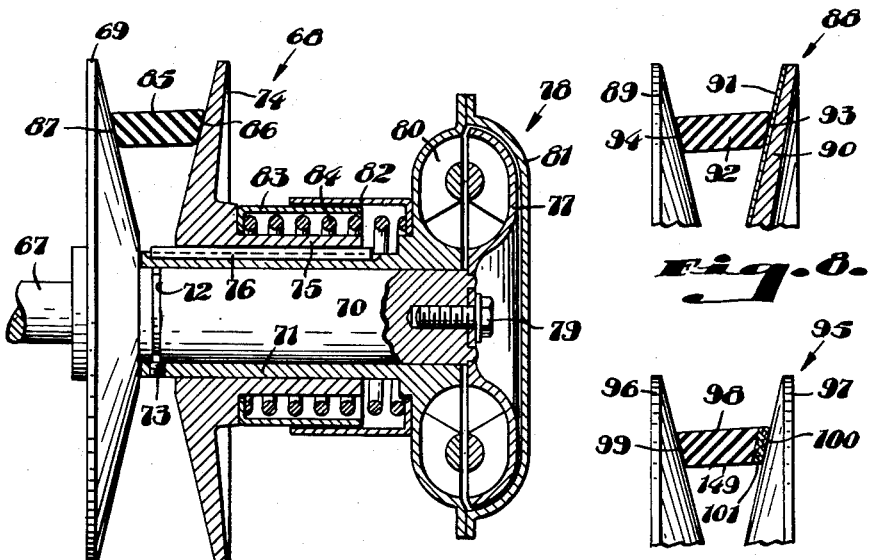
Fig. 7 is a view similar to Fig. 2, but showing still another form of pulley.
Fig. 8 is a fragmentary elevational view, partly in section, showing a still further form of pulley.
Fig. 9 is a view similar to Fig. 8 but showing a further form of belt.
Fig. 10 is a fragmentary perspective view of a novel form of belt.
Fig. 11 is a cross-sectional view, to a somewhat enlarged scale, of the belt of Fig. 10.

In Fig. 7, I have shown still another means for providing a less effective tractive connection between one lateral surface of the belt and the shaft than that between the other lateral surface of the belt and the shaft. According to this form of the invention, a shaft 67 (which may be either a driving shaft or a driven shaft) supports a pulley indicated generally by the reference numeral 68 and comprising a first coned disc 69 fixed for rotation with the shaft 67 and having an axially projecting hub 70 on which is supported a sleeve 71. Means is provided for securing the sleeve 71 against axial movement relative to the hub 70, while permitting relative rotational movement therebetween. In the illustrated form of pulley, the sub 70 is formed with a peripheral groove 72 in which is seated the reduced nose of a screw 73 penetrating the sleeve 71, the screw nose being free to travel peripherally through the groove 72. A second coned disc 74 has a hub 75 supported on the sleeve 71 for axial reciprocation relative thereto, but fixed for rotational movement with said sleeve through the medium of, for instance, a key 76.

One element 77 of a fluid coupling, indicated generally by the reference numeral 78, is fixed to the hub 70 by means, for instance, of a screw 79; and if the shaft 67 is a driving shaft, the element 77 becomes, of course, the impeller element of the coupling 78. The cooperating element 80 of the coupling 78, which is the runner of the coupling if the shaft 67 is a driving shaft, is fixed with respect to the sleeve 71 and, in the illustrated embodiment, is integral therewith. In the form of coupling shown, a cover element 81 cooperates with the element 80 to define a fluid-tight chamber in which the elements 77 and 80 cooperate in a well known manner.

A cylindrical shell 82 cooperates telescopically with a mating shell 83 to house a coiled spring 84, which, being confined between said shell elements which bear, respectively, upon the coupling element 80 and the disc 74, continuously urges the disc 74 resiliently toward the disc 69.

A belt 85 is trained about the pulley 68 with its lateral surface 86 frictionally engaging the coned disc 74 and its opposite lateral surface 87 frictionally engaging the coned disc 69. It will be seen that the belt is cocked between the two discs, in the manner above described; and it will be understood that this relationship may be attained in any one of the several ways heretofore explained.

Since the connection between the disc 74 and the shaft 67 extends through the fluid coupling 78, it will be perceived that the tractive connection between the surface 86 of the belt and the shaft 67 is less effective, to a degree controlled by the characteristics of the coupling 78, than the tractive connection between the surface 87 of the belt and said shaft.

In Fig. 8, I have indicated a further means for providing such a controlled difference in the degree of effectiveness of the tractive connections between the shaft and the two lateral surfaces of the belt, respectively. According to this phase of the disclosure, a pulley 88 comprises a coned disc 89 and a cooperating coned disc 90, the coned surface of the disc 90 being faced with a layer 91 of material having a lower coefficient of friction than the material of the disc 89. This condition may be attained by, for instance, chrome plating the face of the disc 90, or treating the coned surface thereof in any suitable way to reduce the degree of frictional adhesion between such coned surface and the lateral surface 93 of the belt 92, to a controlled extent. In this way, the tractive connection between the surface 93 of the belt and the shaft on which the pulley 88 is mounted will be rendered less effective than the tractive connection between the surface 94 of the belt and the said shaft.

In Fig. 9, I have illustrated a pulley 95 comprising discs 96 and 97 having similar characteristics; but the desired differential is, according to this phase of the invention, provided by a special construction of the belt 98. As shown in Fig. 9, one lateral surface of the belt 98 is faced with a strip 101 of material having a coefficient of friction less than the coefficient of friction of the main body of the belt, so that the effective lateral surface 100 of the belt has a frictional engagement with the coned face of the disc 97 which is less effective than the frictional engagement between the opposite surface 99 of the belt and the disc 96.

A similar effect can be attained in the manner suggested in Figs. 10 and 11 in which I have shown a belt 102 which is conventional in construction, except that, while the lateral surface 103 thereof is conventional, the lateral surface 104 thereof is modified, in its frictional characteristics, by a series of longitudinally spaced plugs 105 inset into said surface with their distal ends lying flush with the belt surface 104. The plugs 105 will be formed of some material having a coefficient of friction substantially less than that of the material from which the belt body is formed, whereby the frictional characteristics of the composite surface, made up of belt body material interrupted by plug ends 106, will be substantially reduced. Any suitable material may be used for the plugs 105, but I presently believe that aluminum, magnesium, or even stainless steel, will be found to be most satisfactory. Preferably, the plugs should be relatively light, in order that the dynamic balance of the belt may not be substantially affected.

It will be noted, of course, that in all forms of assembly thus far discussed, the belt will preferably be cocked, in the manner above described.

Figure 12:
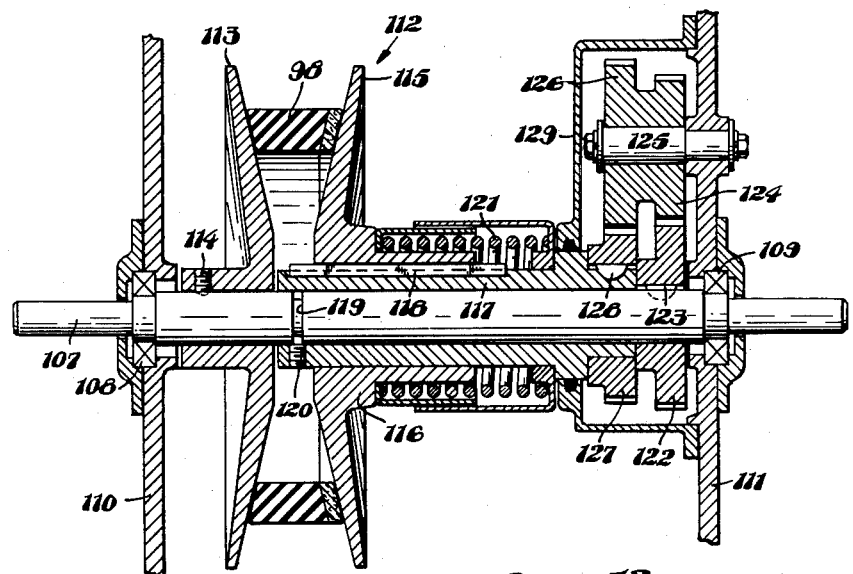
Fig. 12 is a sectional view of a still further form of pulley.
Figure 13:
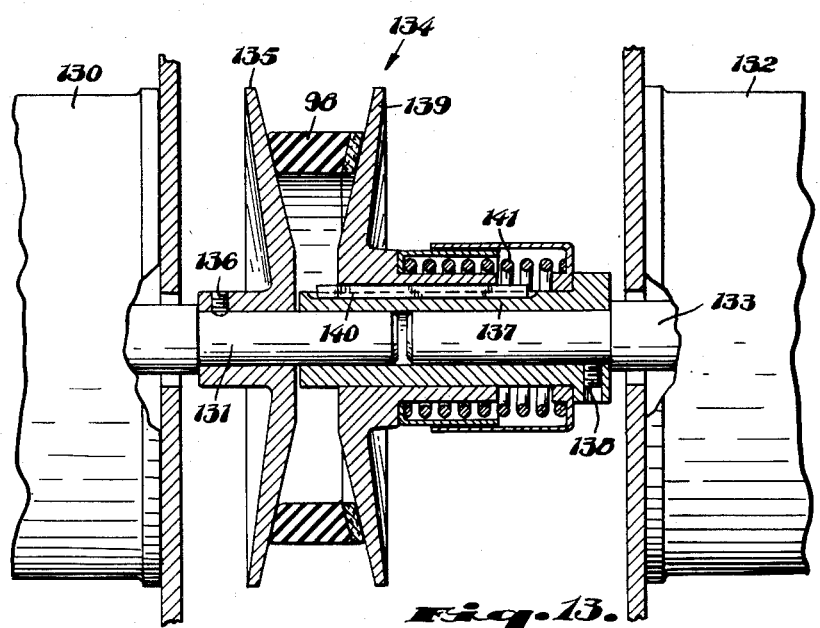
Fig. 13 is a fragmentary elevational view, partly in section, of a pulley arrangement in which the respective discs are driven from separate power sources.

The necessity for such cocking of the belt can be avoided, while retaining many of the advantages hereinabove discussed, by driving one of the discs affirmatively at a speed greater, to a controlled degree, than that of the other disc. Two such arrangements are illustrated in Figs. 12 and 13, respectively. Thus, in Fig. 12, I have illustrated a shaft 107 (which may be either a driving or a driven shaft) suitably supported near its opposite ends in bearings 108 and 109 carried in frame elements 110 and 111, respectively. A pulley, indicated generally by the reference numeral 112, comprises a coned disc 113 fixed to the shaft 107, as by means of a set screw 114. A mating coned disc 115 has a rearwardly projecting hub 116 which is mounted on a sleeve 117 and rotationally fixed thereto through the medium, for instance, of a key 118, whereby the disc 115 may move axially relative to said sleeve toward and away from the disc 113. The sleeve 117 is held against axial movement with respect to the shaft 107, by means, for instance, of a peripheral groove 119 formed in the shaft and receiving the reduced nose of a screw 120 penetrating the sleeve 117. A spring 121, which is preferably housed substantially in the manner above described, continuously urges the disc 115 resiliently toward the disc 113.

A gear 122 is fixed to rotate with shaft 107 through, for instance, a Woodruff key 123, and meshes with a gear 124, of smaller pitch diameter, journalled on a stub shaft 125 which may be suitably supported in the frame 111. A third gear 126 is fixed to rotate with the gear 124, being integral therewith in the illustrated mechanism, and meshes with a fourth gear 127 rotationally fixed to the sleeve 117 through, for instance, a Woodruff key 128. As shown, the pitch diameter of the gear 127 is less than that of the gear 126. Thus, the gear train just described constitutes a speed-increasing train connecting the shaft 107 to drive the sleeve 117, and consequently the disc 115, at a speed somewhat exceeding that of the shaft 107 and the disc 113. As shown, a belt 98, like that described in the discussion of Fig. 9, is trained about the pulley 112. Preferably, the above described gear train will be enclosed in a housing or cover element 129, as shown.

In Fig. 13, I have shown a driving motor 130 having a spindle 131 and a second motor 132 having a spindle 133, the motors being so arranged that their spindles are disposed in axial alignment and substantially in end-to-end juxtaposition. The pulley 134 comprises a coned disc 135 supported on the spindle 131 and rotationally fixed thereto as, for instance, by the set screw 136. A sleeve 137 is supported upon the spindle 133, and preferably is elongated to receive telescopically the distal end portion of the spindle 131. Such sleeve is rotationally fixed to the spindle 133 as, for instance, by means of a set screw 138. A mating coned disc 139 is supported upon the sleeve 137 and is rotationally fixed thereto through the medium of, for instance, a key 140, while being free for axial movement relative thereto toward and away from the disc 135, a spring 141 continuously urging said disc 139 resiliently toward the disc 135. The motors 130 and 132 are so constructed and designed that the spindles thereof will rotate in a common direction, while the speed of the spindle 133 will slightly exceed, to a controlled degree, the speed of the spindle 131. A belt 98 like that illustrated in Fig. 9 will be trained about the pulley 134. It will thus be seen that, in both of the forms of assembly illustrated in Figs. 12 and 13, the shiftable disc of the pulley will be driven at a speed slightly exceeding the speed of the fixed disc, and that the shiftable disc engages a belt surface having a lower coefficient of friction than that of the surface which engages the fixed disc.

Figure 15:
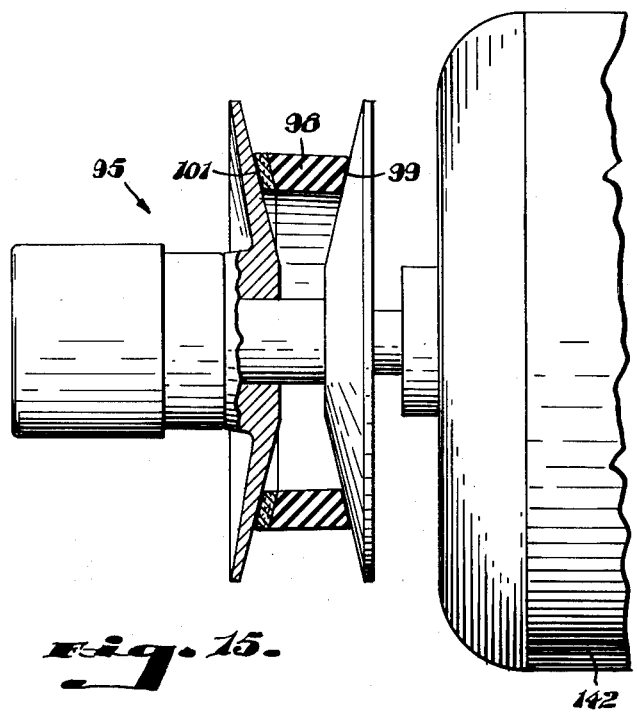
Fig. 15 is a sectional view of the pulley of Fig. 14.
Figure 14:
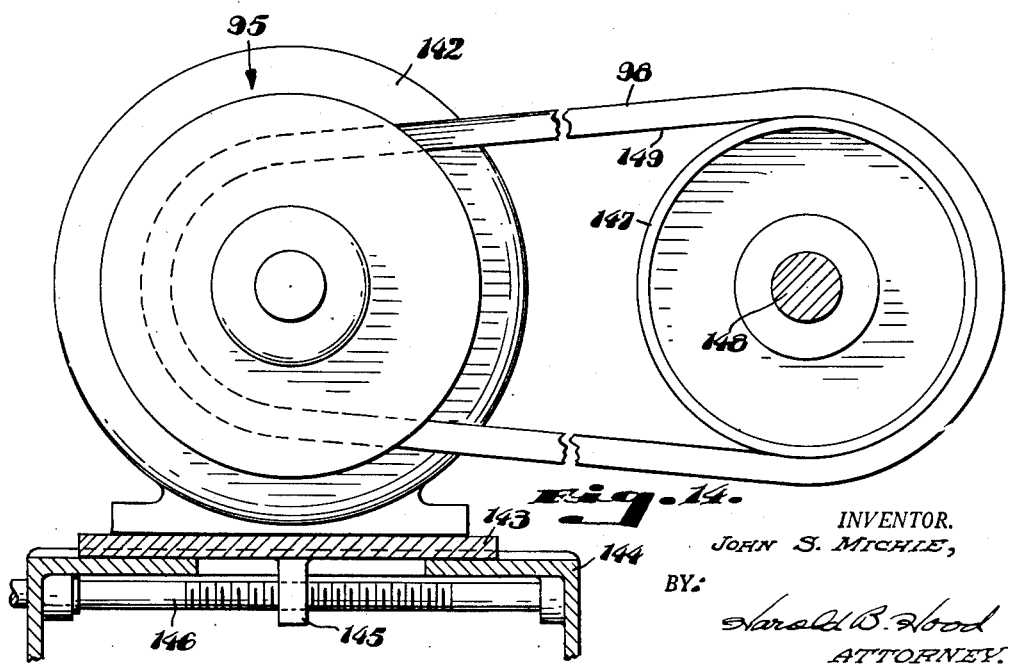
Fig. 14 is an elevational view of a modified form of variable speed drive embodying my invention.

In Figs. 14 and 15, I have shown a somewhat different organization in which the principles of the present invention may be used. Here, a motor 142 is supported upon a plate 143 which is mounted for axial adjustment with respect to a base 144, said plate having a stud 145 with a threaded bore threadedly engaging a screw shaft 146 journalled in the base 144. The motor 142 is arranged with its spindle disposed in a common plane with a driven shaft 148 on which is supported a flat faced pulley 147; and a resiliently expansible V-pulley 95 of conventional construction is mounted on the motor spindle. The belt 98 will, of course, be so arranged that its facing strip 101 is engaged with the shiftable disc of the pulley 95; and, in any one of the ways hereabove described, the belt will be cocked, in passing about the pulley 95, so that the facing strip 101 rides on a pitch diameter slightly greater than that on which the surface 99 of the belt rides the fixed disc of the pulley. The tractive engagement between the belt and the pulley 147 will, of course, involve the inner surface 149 of the belt. As the screw shaft 146 is rotated, in one direction or the other, the motor 142 and its spindle will be moved toward or away from the shaft 148, thereby permitting the pulley discs to move toward each other, or forcing them apart, to vary the ratio between the pulley 95 and the pulley 147.

I claim as my invention:

In combination, rotor means, a belt having outwardly-flaring opposite lateral friction surfaces, a first coned disc supported from said rotor means for coaxial rotation therewith, a second disc supported from said rotor means in facing relation to said first disc for coaxial rotation therewith, a coned element supported from said second disc and cooperating with said first coned disc to define a V-pulley, said coned element and said first disc respectively engaging said opposite lateral surfaces of said belt, and slip-friction means providing between said second disc and said coned element a tractive connection which is less effective than the tractive connection between said coned element and its engaged belt surface, said first coned disc being axially fixed relative to said rotor means, and spring means exerting a resilient force on said second disc in the direction of said first disc and pressing said slip-friction means against said coned element and said coned element against its engaged belt surface.

References Cited in the file of this patent

UNITED STATES PATENTS

| | | |
|---|---|---|
| 818,047 | Power | Apr. 17, 1906 |
| 1,279,547 | Hueber | Sept. 24, 1918 |
| 1,915,107 | Sweigart | June 20, 1933 |
| 2,144,443 | Thomas | Jan. 17, 1939 |
| 2,298,535 | Krag | Oct. 13, 1942 |

FOREIGN PATENTS

| | | |
|---|---|---|
| 591 | Great Britain | of 1912 |
| 30,003 | Great Britain | of 1912 |